(12) United States Patent
Hansen-Sturm

(10) Patent No.: US 7,870,562 B1
(45) Date of Patent: Jan. 11, 2011

(54) MEDIA RENDERING HIERARCHY

(75) Inventor: Craig Hansen-Sturm, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1094 days.

(21) Appl. No.: 11/165,811

(22) Filed: Jun. 24, 2005

(51) Int. Cl.
*G06F 9/44* (2006.01)
*G06F 15/16* (2006.01)

(52) U.S. Cl. .................................. 719/314; 709/220

(58) Field of Classification Search ............... 709/228; 719/314
See application file for complete search history.

(56) References Cited

U.S. PATENT DOCUMENTS

| | | | | |
|---|---|---|---|---|
| 6,262,776 B1 * | 7/2001 | Griffits | ................. | 348/512 |
| 7,404,194 B2 * | 7/2008 | Wason et al. | ................. | 719/328 |
| 7,412,685 B2 * | 8/2008 | Miller et al. | ................. | 717/101 |
| 7,441,020 B2 * | 10/2008 | Dideriksen et al. | .......... | 709/221 |
| 2002/0198888 A1 * | 12/2002 | Young | ................. | 707/100 |
| 2004/0267940 A1 * | 12/2004 | Dideriksen et al. | .......... | 709/228 |
| 2005/0278451 A1 * | 12/2005 | Yamashita | ................. | 709/229 |
| 2006/0184980 A1 * | 8/2006 | Cole | ................. | 725/88 |
| 2009/0254577 A1 * | 10/2009 | Balassanian et al. | ........ | 707/101 |

\* cited by examiner

*Primary Examiner*—H. S. Sough
*Assistant Examiner*—Abdou K Seye
(74) *Attorney, Agent, or Firm*—Hickman Palermo Truong & Becker LLP

(57) ABSTRACT

To process media data from one or more sources, a hierarchy of media components are formed. Each media component receives as input one or more streams of media data and manipulates the media data to produce an output media stream. The media components conform to a uniform plug-in structure. The plug-in structure defines an abstraction that facilitates the hierarchical organization of the media components and that allows the media components to interact, in a decoupled manner, with each other and with processors that perform specific types of media data manipulations. The hierarchy can be reorganized dynamically.

40 Claims, 4 Drawing Sheets

MEDIA RENDERING HIERARCHY

FIELD OF THE INVENTION

The present invention relates to software that renders media data.

BACKGROUND OF THE INVENTION

Software that renders audio data typically has to mix multiple inputs of audio data, convert audio data to different formats, and apply many effects. Generally, the software uses a potpourri of specialized software components ("audio units") that perform specific functions and tasks, such as mixing inputs, converting formats, and applying effects. The audio units are generally organized into an acyclic graph, with each node being an audio unit that performs a special function on a stream of data. The number of audio units can easily proliferate, as can the complexity of the graph The audio units perform many different types of functions and are interacted with in different ways. Thus, developing audio rendering software can be very complex and overwhelming.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for rendering media data is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is an approach that simplifies the task of developing software that renders audio data or any type of media data. The approach is based on an abstraction referred to herein as a media graph.

Figure 1:
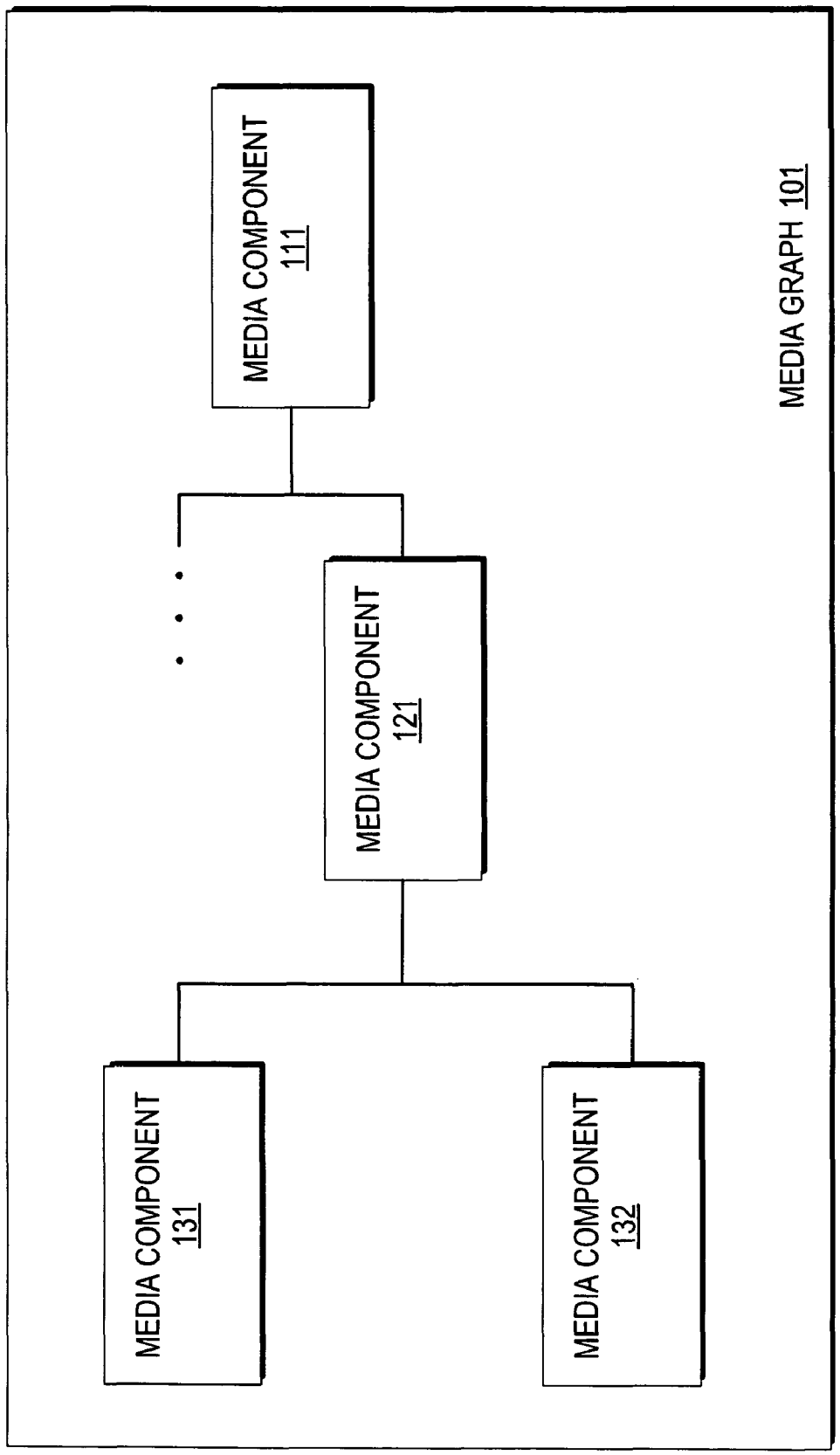
FIG. 1 is a block diagram of a media graph component according to an embodiment of the present invention.

FIG. 1 is a diagram depicting a hierarchical media graph according to an embodiment of the present invention. A media graph is comprised of hierarchically related pluggable media components referred to herein as media graph components or graph components. A media graph component can be viewed as retrieving and processing media data from one or more sources of media data. Because of the explicit hierarchical structure of the media graph, media graph components have a containment relationship. Media data is processed by graph components according to the hierarchy. As shall be explained in greater detail, a media graph component serves as an abstraction for an "assembly line" of other software components that perform the work of processing media data in assembly line fashion.

Specifically, a media graph component can be viewed as a software component that receives as input a stream of media data ("input media data"), that processes and/or manipulates the input media stream, and that generates, as output, a stream of media data ("output media stream"). Input to a graph component may be from another graph component or external source. If the input to the graph component is from another graph component, the other graph component is referred to as a "child" of the graph component; this child is referred to herein as contained or owned by its parent. Output of a graph component may be supplied to another graph component or to an external destination. If the output of a graph component is supplied to another graph component, the other graph component is referred to as a "parent" of the graph component; the parent is referred to herein as containing or owning its child. An external source or destination for a given graph component in a media graph is a source or destination other than another graph component in the media graph. The hierarchy of a media graph reflects the way media data flows and is processed by the graph components of the media graph, and reflects the hierarchy of control messages that are propagated through the graph Other software components ("applications") use and interact with the media graph 101 and its constituent graph components as a unit through an abstraction interface. For example, to communicate with any given graph component of media graph 101, messages are transmitted via an interface of media graph 101. The message may be propagated recursively to the embedded graph components of media graph 101. Specifically, the message is transmitted to graph component 111, which transmits the message to each of its children (including graph component 121), which in turn, transmit the message to each of their children, and so forth. A graph component receiving a message may perform some action in response to the message, forward or forego forwarding the message to some or all the children or parent graph components, or combinations thereof.

An interface abstraction is a set of functions for software components ("abstracted components") that provide a particular functionality and that are exposed to other software components ("client components") to access that functionality. The logic and/or implementation of the abstracted component that provides the functionality are hidden from a client component. The client component accesses the functionality of the abstracted component by invoking the functions of an interface that conforms to the interface abstraction. In this manner, the graph components can communicate with a wide range of software component "plug in" types. Functions of the interface abstraction have particular parameters, parameter types, and return value types.

Graph components provide a powerful and flexible abstraction for developing software that can exploit sets of heterogeneous software components (e.g. libraries) that process media data. A set of heterogeneous software components exposes many interface designs (i.e. many different functions and/or different parameters). Graph components facilitate integrating and managing heterogeneous software components by enabling the formation of an easier to manage unit of software that is accessed via consistent interfaces. The hierarchical nature of graph components enables default property and "state" information to be inherited from parent to child. When managing the graph in response to external user-interaction, all control information is similarly propagated from parent to child. In this manner, each level in the media graph can be managed as if it were a single composite object. Graph components can be easily plugged into a media graph. To process media data, a media component invokes specific functionality of external software components in assembly line fashion. Different media graphs can be easily developed for different applications and scenarios. Finally, a media graph can be dynamically altered once it is used to process media data, in particular, the state of the graph (whether it is running, paused, or stopped), the topology of the graph (the interconnections between graph components), and the processing behavior (how the various audio components alter the media data flowing through the graph), can all be varied dynamically Media data is digital data that represents audio or video and that can be played or generated by an electronic device, such as a sound card, video card, or digital video recorder. A quantity of multimedia data represents audio or video for a period of time.

Illustrative Media Graph

FIG. 1 is a block diagram depicting an illustrative media graph according to an embodiment of the present invention. Referring to FIG. 1, media graph component 101 includes graph component 111 at the first level of media graph 101, graph components 121 at the second level, and graph components 131 and 132 at the third level. Media graph 101 includes other graph components not depicted in FIG. 1. Graph components 131 and 132 are "leaf graph components" because graph components 131 and 132 receive an input media stream from an external source. Examples of external sources include a media player that reads a stream of data from a media file (e.g. a file that contains WAV or MPEG data) or that receives media data from a media input device, such as an audio card.

Graph components 131 and 132 each process respective input media streams and each supply an output media stream to graph component 121 at the next level. Graph component 121 processes the input media streams from graph components 131 and 132. Such processing can involve mixing the input media streams to form an output media stream, which is supplied to graph component 111. Graph component 111 receives input media streams from graph component 121 and other child graph components not shown, processes the input media streams to generate an output media stream, which is supplied to the device driver of an media output device. Graph component 111 is referred to as the root graph component because the media data processed by the graph eventually flows through the graph component. Graph component 111 also provides the output of the media graph 101.

Media graph 101 is executed periodically in cycles by various threads, a unit of work being performed within the context of each thread. For example, an operating system thread with a real-time execution priority ("working thread") is scheduled to periodically execute media graph 101. Each cycle of execution by the working thread includes three phases: 1) a working phase in which the media graph 101 is invoked and executed to process and generate media data, 2) a pre-work phase, in which operations are executed that are preferably executed in the high priority thread but that cannot be performed during the working phase—such operations include setting parameters that affect the processing of media data (e.g. volume, sampling rate) and dynamically altering the structure of the media graph, and 3) a post-work phase, in which various maintenance operations are executed that cannot be executed during the working phase—such operations include updating internal message queues and scheduling additional events which will be executed on lower priority threads. Because of the of the real-time nature of the working thread the structure of media graph 101 cannot be changed during the working phase.

Some work performed by or for the media graph can be performed more lazily in a lower priority thread. This work is performed by an administrative thread. Examples of such work include the de-allocation of memory for structures no longer used or needed to process media data. Execution by the administrative thread of the media graph is referred to herein as the administrative phase. Finally, one or more threads may be used to interact with the client interface to the graph. These threads are used to control the runtime behavior of the media graph. Examples of such work include starting/stopping the graph, setting the sample or playback rate, and setting parameters such as dynamics, eq, or panning.

To retrieve media data using media graph 101, a function or routine of the abstraction interface of media graph 101 is invoked during the working phase, causing the media graph to retrieve media data by recursively invoking upstream graph components of media graph 101, or more specifically, recursively invoking heterogeneous software components that have been plugged into graph components of media graph 101, as shall be explained in greater detail.

Pluggability

The ability to plug in a media component into a media graph and to plug in heterogeneous software components into media components is achieved, at least in part, through the use of various interface abstractions. All graph components expose the same interface abstraction, that is, graph components include as an interface, an exposed set of functions that conform to the interface abstraction. This interface contains two parts, a fixed and variable part. The fixed interface abstraction exposes, for example, functions for initialization and un-initialization and for creating/deleting graph components. The variable part provides a messaging interface for providing information and for controlling the behavior of itself or some of its subcomponents. The fixed interface footprint is intentionally kept small and homogeneous, as it must be implemented by all components; however, the variable interface footprint is relatively large and heterogeneous as parts of it may be optionally implemented by components.

To use the functionality of heterogeneous software components, a media component is configured to hold and interact with "processors" that serve as an interface to a possibly external software component referred to herein as a callout component. Each processor provides an interface to a callout component and/or a specific functionality of a callout component. Each processor supports and conforms to the same interface abstraction; media components are configured to interact with processors that support and conform to the interface abstraction. Thus, any callout component can be plugged into a processor and any processor can be plugged into a media component. A processor's internal implementation is tailored to the callout component and the functionality the processor is intended to provide. The processor's implementation is used to a) adapt the interface of the callout component to the media component, and b) to optionally implement functionality not present in the callout component. It is also possible to implement all functionality entirely within the processor itself without the use of a callout component.

The processors serve as building blocks for building graph components suited to a particular application. When the media graph is being used to generate media data, processors of a media component are invoked in assembly line fashion to process and/or manipulate media data. Processors can be thought of "single units of production" in this assembly line.

Detailed Structure of Media Components and Processors

A single data structure is used to represent various graph component use-case scenarios, including, for example, graph components that process media data from external sources, process media data from other components and/or supply media data to output devices. According to an embodiment of the present invention, the graph components conform to a uniform structure referred to herein as a graph component structure. The uniform structure includes interfaces that conform to an interface abstraction.

According to an embodiment of the present invention, the graph component structure may be defined and developed using object-oriented techniques. Classes (and subclasses of the classes) may be used to define data structures and functions (i.e. methods) of the components. However, the present invention is not limited to object oriented implementations.

Figure 2:
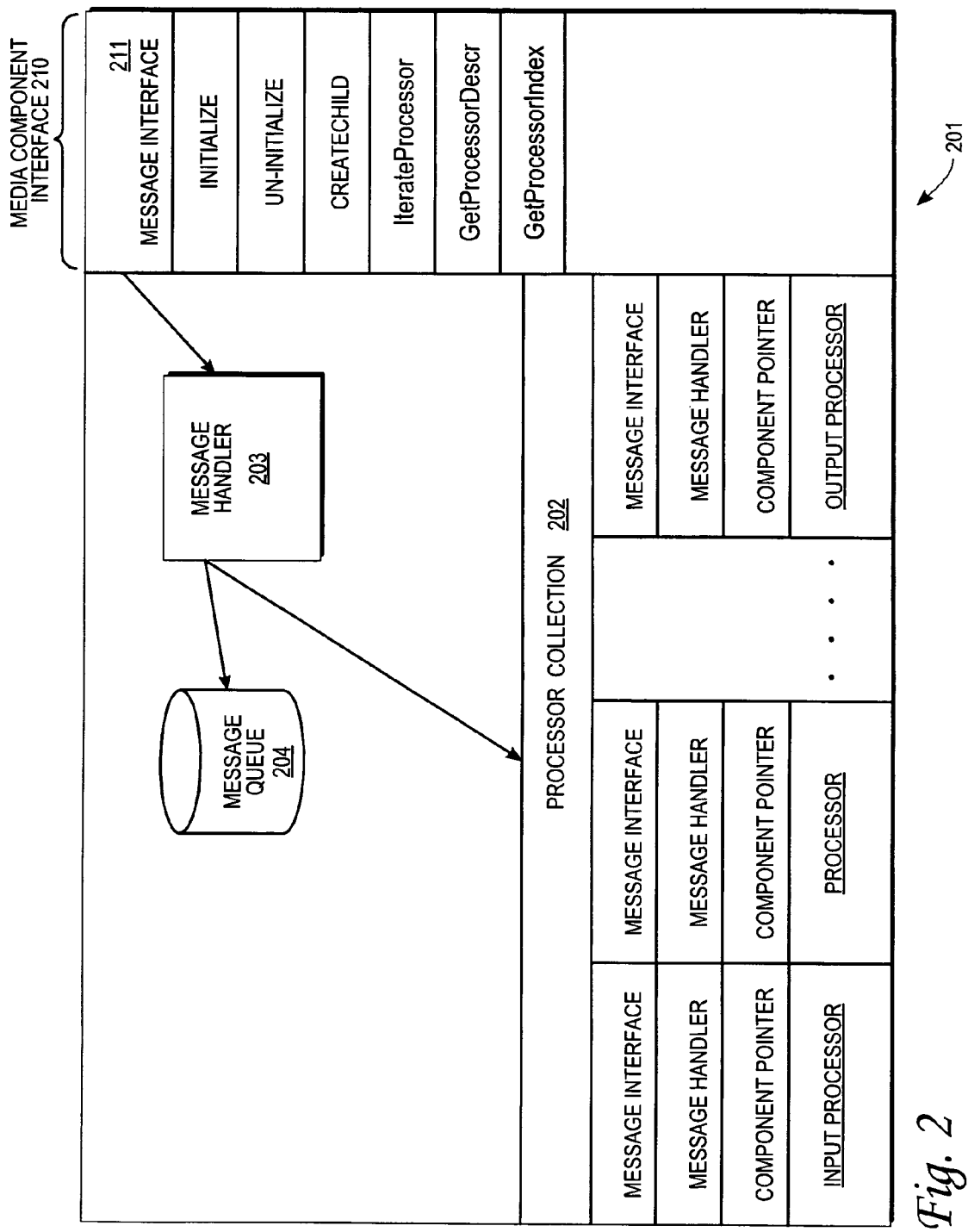
FIG. 2 is a block diagram of a structure of graph components that may be plugged into a media graph component according to an embodiment of the present invention.

FIG. 2 is a block diagram depicting a graph component structure according to an embodiment of the present invention. Referring to FIG. 2, it depicts pluggable structure 201. Pluggable structure 201 includes media component interface 210, an interface that conforms to an interface abstraction and that is invoked to interact with a graph component. The media component interface 210 includes a component message interface 211, a set of one or more functions that may be invoked to transmit messages to a graph component. These functions form the fixed-part of the media component interface, while the component message interface forms the variable-part of the media component interface.

Processor

Processor collection 202 is a collection of processors. A processor is an interface that provides a specific function for processing media data or for controlling how media data is processed when processed by a media graph. Each processor in the processor collection conforms to the processor interface. Typically, a processor invokes a callout component to perform the function; however, this need not always be the case as processors may themselves perform the function. According to an embodiment of the present invention, callout components include the library of Core Audio Units, available from Apple, Inc Various types of processors provide different types of functionalities. For example, a processor may be used to adjust volume, eq, or sample rate of audio data; to supply a media stream to an output device; or to mix multiple input media streams into one media stream.

The processor structure includes a processor interface that conforms to an interface abstraction, which includes a message interface for communicating with a processor ("processor message interface"). The processor structure also includes a message handler ("processor message handler"), which handles messages communicated to the processor. While the internal structure may vary between types of processors, the interface for all processors is constant. In this way, one can include additional other functions for a particular type of processor function.

The processor structure also includes a component pointer, which points to a callout component, and a graph component pointer, which points to the graph component that contains the processor, allowing the processor to send messages to the graph component and other processors therein.

According to an embodiment, the processor collection in a graph component contains a subset of all available processors referred to herein as working processors. A working processor is invoked during the working phase to process, manipulate and/or generate media data. One type of working processor is an input processor, such as a processor that retrieves media data from an external source or that mixes input media streams from multiple child graph components. Another example of a working processor is an output processor, such as a processor that supplies a media stream to a parent graph component or to an output media device. A final example of a working processor is an internal processor, which accepts a media stream from its adjacent upstream processor, processes that media data, and passes it to its adjacent downstream processor.

Working processors include an output function within their processor interface. The output function is invoked to retrieve media data from the output processor. Input processors are supplied an input function that is invoked to retrieve media data from the media component or external code that is upstream of the media component containing that input processor. Similarly, output processors are supplied with an output function, which is invoked to supply media data to the media component, or external code that is downstream of that output processor. Internal processors contain a shared procedure that is used for input and output between adjacent working processors. In all cases, default procedures are supplied by the system; however, these may be overridden.

Each processor is associated with a processor id and processor descriptor. A processor id is a value that uniquely identifies a processor among the processors of the processor collection in a graph component. A processor descriptor identifies a type of processor. A processor descriptor may identify a processor as an IO (input-output) processor or as a processor that performs a specific type of function such as data format conversion or an effect. For example, a processor descriptor for an effect may identify a processor that adjusts volume. A processor descriptor for a converter may identify a processor that adjusts playback rate. And an IO descriptor may identify a processor that mixes multiple inputs or that receives a particular type of media data from an external source.

Message Handling

To support communication of messages, the graph component structure includes a component message handler 203 and a component message queue 204. Component message handler 203 handles messages transmitted to a graph component via component message interface 211.

Messages are handled synchronously or asynchronously within a call made to the component message interface 211. A message is handled synchronously when the processing required to carry out the message is performed within the call made to component message interface 211 to communicate the message. A message is handled asynchronously when such processing is not carried out within the call but is instead scheduled to be carried out later. Messages handled asynchronously are first stored in the component message queue and later dequeued and processed.

For example, a graph component receives a message to adjust volume via a call made to its component message interface. The component message handler of the graph component receives the message. If the message is handled synchronously, during execution of the call the component message handler routes the message to the processor that handles volume (i.e. invokes a function of the message interface of the processor). The processor performs the operations needed to adjust the volume. Finally, execution of the call returns to the caller with the operations needed to carryout the message having been completed and performed within the call synchronously.

As an example of handling a message asynchronously, the component message handler receives a message to adjust volume via a call made to component message interface 211. The message includes a timestamp specifying to adjust the volume at a future time. Within the call, the component message handler stores the message in the message queue in association with the timestamp. Finally, execution of the call returns to the caller, with the message being stored in the message queue but without the operations needed to carryout the message having been completed. Instead the message is dequeued later at a time in particular, during the pre-work phase of the working thread. At that time, all messages within a range of time stamps are evaluated and the volume is adjusted.

Messages may be routed, synchronously or asynchronously, to the component message handler of a processor or the component message handler of a child graph component. The way the messages are routed depends on the implementation of the component message handler and on the type of message supplied Certain messages, such as start/stop normally recurse to child graph components, while other messages, that may return a single parameter representing the state of a processor such as "current volume level", will not recurse. Because there is only one type of media graph component, the handlers will be different because different processors are contained by each component. Each processor will install additional handlers in each component.

A component message handler may receive a message that specifies a target, by including, for example, a processor id. The message handler routes the message to the target specified by the processor id.

The message may be routed based on the message's type, which can be represented by a processor descriptor. For example, messages requesting a volume adjustment may be sent to the processor that handles volume changes. Messages requesting a change in sampling rate may be sent to the processor responsible for changing sampling rate. In an embodiment, if the processor that handles a type of message is not in the processor collection of the graph component, the processor is created and added to the collection dynamically.

When a processor is initialized, the processor may inform its respective component message handler of what messages to send to the processor. For example, a processor may request that messages of a certain type be sent to the processor, or a processor may install additional message types that only it knows about.

A component message handler may not be able to determine a target processor for a message. In this case, the message may be broadcast, that is, routed to all processors in the graph component. Messages may be broadcast from input to output or output to input depending on the type of the message. Typically, the first processor to respond will handle the message.

According to an embodiment, two categories of messages may be received: static messages and dynamic messages. Dynamic messages specify a request that can be carried out once a media graph is in a state where can be invoked to generate media data. Typically, dynamic messages specify a change to a property that can be set or changed dynamically. Static messages are not carried out dynamically, and specify changes to properties that cannot be set or changed dynamically.

Other Functions in Media Component Interface

Media component interface 210 includes other interface routines other than those of message interface 211. These include interface routines such as 1) Initialize and Un-initialize, for initializing and un-initializing a graph component, 2) CreateChild, for creating a child graph component, 3) IterateProcessor, for iterating through the processor collection, 4) GetProcessorDescr, for getting a pointer to a processor using a processor descriptor, and 5) GetProcessorId, for getting a pointer to a processor using a processor descriptor.

Operational Example

Figure 3:
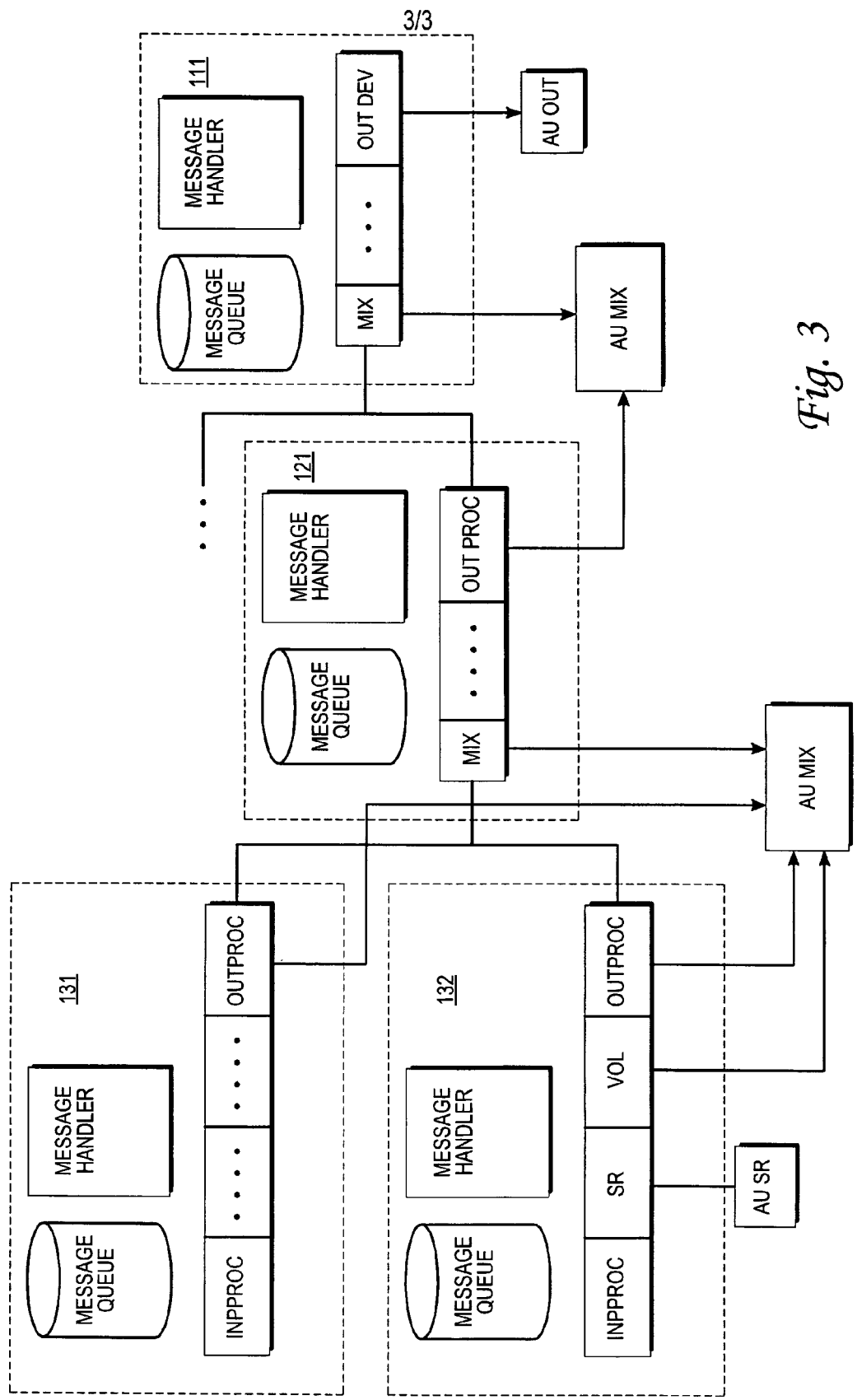
FIG. 3 is a block diagram of a structure of graph components and callout components called by processors of the graph component according to an embodiment of the present invention.

FIG. 3 is a block diagram depicting additional details of media graph 101 and its constituent components. In addition, various operations performed by media graph 101 are illustrated with reference to FIG. 3.

Referring to FIG. 3, it depicts media graph 101 and its constituent graph components, and various structures of constituent graph components, including a component message queue and component message handler. For each constituent graph component depicted, FIG. 3 depicts the processor collection of the graph component.

Graph component 111 includes an input processor MIX and an output processor OUTDEV, and possible other components not depicted. Input processor MIX mixes input media streams supplied by child components of graph component 111 to form a single media stream. Input processor MIX includes a collection of supply functions, each supply function being a function pointer to an output function of an output processor ("child output processor") of a child component.

The callout component for input processor MIX is AU MIX. This callout component is the software component that actually performs the work of mixing media data retrieved by input processor MIX of graph component 111.

Output processor OUTDEV is an output processor for supplying data to an output media device. The callout component for processor OUTDEV is AU OUT. This callout component is a component for interfacing with a media output device.

The working processors of a graph component are referred to herein as the working strip. A working strip is associated with an order ("strip order") from an input end to an output end. An input processor is at the input end and an output processor is at the output end, and all other processors are internal. The processors in the working strip form a doubly linked list that reflects the order of processing within the strip Each processor in the working strip includes a previous pointer pointing to the upstream processor in the strip order, if any, and a next pointer pointing to the downstream processor in the strip order, if any. Processors that have these links are directly involved with processing during the working phase. Processors that do not have these links, but which still reside in the media component, typically delegate their work to another processor that is part of another working strip.

The working strip of graph component 111 includes input processor MIX at the input end and output processor OUTDEV at the output end, and possible zero or more other working or non-working processors in between.

Graph component 121 includes an input processor MIX and output processor OUTPROC, and possible other components not depicted. Input processor MIX mixes input media streams supplied by child components of graph component 121 to form a single media stream. Input processor MIX includes a collection of supply function pointers. One supply function of the collection points to output processor OUTPROC of graph component 131 and another supply function points to output processor OUTPROC of graph component 132. The working strip of graph component 121 includes input processor MIX, output processor OUTPROC, and zero or more other processors.

Graph components 131 and 132 include an input processor INPPROC and output processor OUTPROC, and possible other components not depicted. Both input processors INPPROC retrieve media data from an external source, via, for example, a function invocation of the external source.

The processor collection of graph component 132 includes a working strip comprised of input processor INPPROC and an output processor OUTPROC. The processor collection also includes processors SR and VOL. Working processor SR is used to adjust the sampling rate of media data retrieved for graph component 132 and non-working processor VOL is used to adjust the volume of the media data retrieved. VOL is non-working because it delegates its work to upstream component 121.

The callout component for input processor MIX is AU MIX. This callout component is the software component that actually performs the work of mixing media data retrieved by input processor MIX.

The callout component for input processor VOL is AU MIX. AU MIX receives output from graph component 132 via output processor OUTPROC of graph component 132 and input processor MIX of graph component 121. AU MIX adjusts the volume of the output received according to a parameter that governs volume. To change this parameter, VOL transmits a message to AU MIX to adjust the parameter.

The callout component of input processor VOL and input processor MIX of graph component 121 is the same. However, the processors provide an abstraction to different functionality of AU MIX. Input processor VOL provides an abstraction to adjust volume, while the input processor MIX provides an abstraction for mixing media streams. It is embodiment independent whether VOL implements its own callout component, or whether it leverages functionality in another processor.

The output processor OUTPROC of graph component 132 also has AU MIX as a callout component. This allows output processor OUTPROC to be used to set one or more parameters of AU MIX by forwarding messages to graph component 121 Similarly, the component AU MIX is the callout component of output processor OUTPROC of graph component 131. The component AU MIX that is the callout component of input process MIX of graph component 111 is also the callout component of the output processor of graph component 121.

Processor SR of graph component 132 is a processor for setting the sampling rate. The callout component of processor SR is AU SR.

Illustrative Uses of Intergraph Messaging

The message interfaces of graph components and processors provide a uniform means for a graph component and processors to transmit messages. Because the graph component has a messaging interface that conforms to the same interface abstraction any graph component or processor can be communicated with using the same looking interface, even though graph components and processors provide a different functionality and/or are implemented in a different ways. Functionality of a given processor can be accessed via the same looking messaging interface, thereby facilitating the pluggability of processors. The following scenarios illustrate the uses of the messaging mechanism.

To change the volume of the media stream originating from graph component 132, a message requesting a volume change is transmitted to graph component 132 via its message interface. The message specifies to change the volume at a future time identified by a time stamp. Based on the fact the message specifies a future time, the message handler determines that the message is to be handled asynchronously, and adds the message to its respective message queue. During the pre-work phase, at a time corresponding to the timestamp, the media handler reads the message from the message queue and routes the message to input processor VOL via the message interface of the processor. The processor VOL then forwards this message to its callout component AU MIX, which changes the parameter affecting volume accordingly.

When processor VOL is initialized, it needs to obtain the pointer to callout component AU MIX. To obtain the pointer, processor VOL transmits a message to the component message handler of graph component 132. The message designates a target using the processor descriptor for an output processor. The message handler determines that the processor associated with the descriptor is output processor OUTPROC of graph component 132, that the target of the message is the output processor OUTPROC, and in response, transmits the message to output processor OUTPROC. The output processor OUTPROC responds to the message by returning its pointer to its callout component AU MIX During initialization, an output processor OUTPROC of graph component 132 provides input processor MIX a function pointer to OUTPROC's output function. To accomplish this task, the output processor OUTPROC transmits a message to the parent graph component 121. The message includes the function pointer and a descriptor identifying a IO type processor. Based on the descriptor, the message handler of graph component 121 forwards the message to input processor MIX of graph component 121, which then makes a copy of itself carefully cloning its internal state, adds an additional input, and then the new function pointer to this new input. Adding a supply function for an output processor to the collection of supply functions of an input processor is referred to herein as connecting the output processor to the input processor or as connecting the graph component of the output processor to the graph component of the input processor.

Pulling Media Data Through the Working Strips

During the working phase, as mentioned before, to retrieve media data using media graph 101, a working thread recursively invokes the graph components of media graph 101. This is performed by recursively invoking the working strips of the graph components of media graph 101. Obtaining media data in this way is referred to herein as "pulling media data" through a media graph.

For example, to pull data through media graph 101, the working thread invokes a function of output processor OUTDEV. This causes output processor OUTDEV to invoke the subsequent processor in the working strip order, and so forth. When the input processor at the end of the working strip is invoked, the input processor invokes each supply function in its collection of supply functions, which are the output functions of the child output processors. This is in turn causes the child output processors to invoke their working strips.

Eventually, the input processors of leaf graph components of media graph 101 (including graph components 131 and 132) are invoked, which retrieves media data from external sources. From this point, the recursive call returns.

Dynamically Adding a Graph Component

Once a media graph has been formed and used to generate a media stream from a set of external sources, it may be desirable to process media data from another external source. This requires adding a set of graph components to the media graph while the graph is in a running state, that is, while the working thread is active A set of graph components added at this stage is referred herein as being added dynamically.

The set of graph components added may comprise a single graph component or a tree of graph components added to the media graph as a "media subgraph". In any case, to add a set of graph components, the output processor of the root of the subgraph is attached to the input processor of the parent subgraph In this manner, the parent root now becomes the root of the subgraph. Default properties such as the channel layout and the audio sample rate, are inherited by the child subgraph at the time the connection is made. This inheritance of properties is accomplished by recursively reinitializing each component in the subgraph to apply the new inherited values. The process of dynamically connecting a media subgraph is referred to herein as dynamic subgraph placement.

To perform dynamic subgraph placement, a subgraph is first formed. This may entail creating and initializing graph components and processors that point to their respective callout components, and connecting parent graph components to their media child components.

Next, a clone of the input processor of the parent graph component is generated. This may be initiated by the output processor of the connecting graph component by transmitting a message to the input processor of the target to create a clone. The clone has the same state as the input processor in the parent The cloned input processor is connected to the output processor of the connecting graph component.

At this point, the cloned input processor is connected to the current child components of the parent graph component and the connecting graph component, and is ready to be added to the target graph component in place of the current input processor of the target graph component. To add the cloned input processor, a remove-input-processor and add-input-processor message is sent to the root graph component of the media graph. The messages are scheduled and added to the message queue to be carried out during the pre-work phase, when the structure of the media graph can be altered.

During the pre-work phase, the message handler of the root graph component first processes the remove-input-processor message. This entails removing the current input processor of the target graph component from the processor collection and working strip of the target graph component. For example, to remove the input processor from the working strip, the next pointer pointing to the input processor from the adjacent working processor in the working strip is set not to point to the input processor. In addition, the de-allocation of memory and other resources allocated to the input processor are scheduled for de-allocation during the administrative phase to avoid blocking the working thread with work that cannot safely be performed on a real-time priority thread. The de-allocation is scheduled in the future by adding a time-stamped message to the component message queue of the root graph component, to be processed during by the administrative thread at a later time Next, continuing during the pre-work phase, the add-input-processor message is processed. The clone input processor is added to the processor collection and working strip of the target graph component. To add the clone input processor to the working strip, the next pointer of the adjacent working processor is set to point to the cloned input processor and the previous pointer of the cloned input processor is set to point to the adjacent working processor. At this point, the child subgraph is fully attached to its parent, and the normal working phase may proceed as normal.

Hardware Overview

Figure 4:
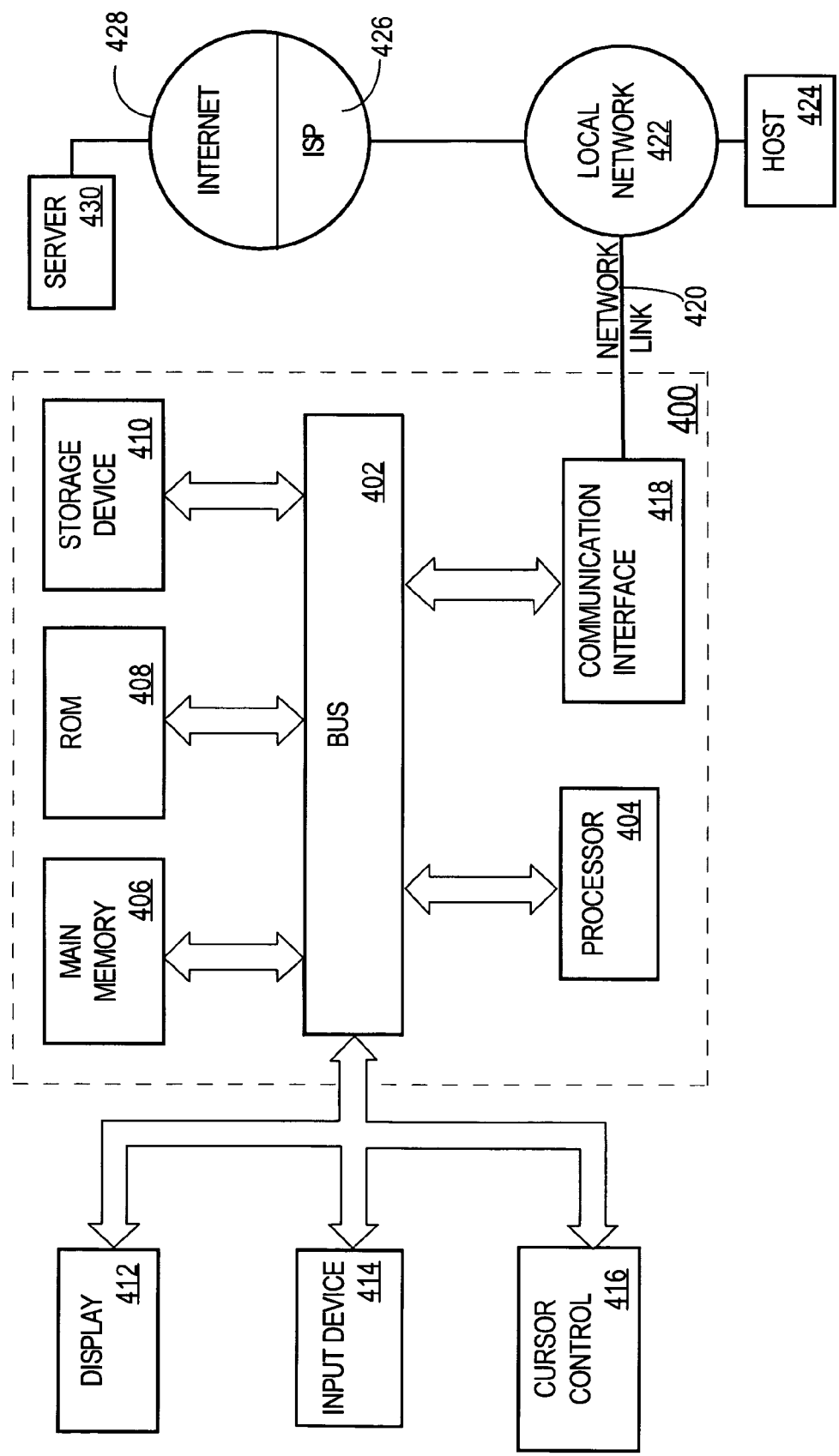
FIG. 4 is a block diagram of a computer system that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing media data, comprising steps of:
   generating a graph that includes a plurality of graph components that input and output media data, wherein the graph conforms to a multi-level, branched hierarchical structure;
   wherein the graph comprises at least:
     1) a parent component, at the top level of the hierarchical structure, that outputs media data;
     2) a plurality of intermediate components, including a first plurality of intermediate components that output media data to the parent component;
     3) a plurality of leaf components that input media data from media sources, wherein each leaf component of the plurality of leaf components outputs media data to a component at a higher-level in the hierarchical structure;
   wherein each graph component of said plurality of graph components comprises an ordered, working strip of plug-in components, each said working strip comprising an input plug-in component and an output plug-in component; and recursively invoking plug-in components in each working strip of plug-in components in each of said plurality of graph components, beginning with the parent component and proceeding down the hierarchical structure, thereby causing media streams to flow from the plurality of media sources, through working strips of plug-in components in said plurality of leaf components and said plurality of intermediate components, and to the parent component;
   wherein each plug-in component in each of the plurality of graph components exposes a plug-in interface that conforms to a common plug-in interface abstraction;
   wherein each working strip comprises at least one plug-in component that invokes a media component that does not support the plug-in interface abstraction, the media component providing a functionality for processing or manipulating media data;
   outputting media data at the parent component based on the media streams;
   wherein the steps of the method are performed by one or more computing devices.

2. The method of claim 1, wherein:
   a first graph component of said plurality of graph components includes a first plurality of plug-in components, said first plurality of plug-in components including a first plug-in component;
   a second graph component of said plurality of graph components includes a second plurality of plug-in components, said second plurality of plug-in components including a second plug-in component; and
   the step of recursively invoking plug-in components includes the first plug-in component calling the second plug-in component.

3. The method of claim 2, wherein:
   the first plug-in component includes a collection of function pointers that each point to a function of a plug-in component of a child graph component of said first graph component, each function pointer of said collection of function pointers pointing to a function for supplying media data;

said collection of function pointers including a pointer to the second plug-in component; and recursively invoking each plurality of plug-in components includes the first plug-in component invoking each function pointed to by the collection.

4. A non-transitory computer-readable volatile or non-volatile memory storing one or more sequences of instructions which, when executed by one or more processors, causes the one or more processors to perform the method recited in claim 3.

5. A non-transitory computer-readable volatile or non-volatile memory storing one or more sequences of instructions which, when executed by one or more processors, causes the one or more processors to perform the method recited in claim 2.

6. The method of claim 1, wherein the step of generating media data is executed by a working thread, the method further including:

altering the graph, wherein altering the graph causes a data structure to be no longer needed by the graph; de-allocating resources previously allocated to said data structure; and wherein the step of de-allocating is performed by second thread different then said working thread.

7. The method of claim 6, wherein the second thread has a lower execution priority than the working thread.

8. A non-transitory computer-readable volatile or non-volatile memory storing one or more sequences of instructions which, when executed by one or more processors, causes the one or more processors to perform the method recited in claim 7.

9. A non-transitory computer-readable volatile or non-volatile memory storing one or more sequences of instructions which, when executed by one or more processors, causes the one or more processors to perform the method recited in claim 6.

10. The method of claim 1, wherein said media data is audio data.

11. A non-transitory computer-readable volatile or non-volatile memory storing one or more sequences of instructions which, when executed by one or more processors, causes the one or more processors to perform the method recited in claim 10.

12. The method of claim 1, wherein each graph component of said plurality of graph components includes a message interface that conforms to the common plug-in interface abstraction, the method further including:

a particular graph component receiving a message for a plug-in component of said particular graph component, said message being transmitted to the particular graph component via a call to the message interface, said particular graph component including a certain plurality of plug-in components; and forwarding the message to at least one plug-in component of said certain plurality of plug-in components;

based on the message, the at least one plug-in component modifying a parameter affecting how the at least one plug-in component processes or manipulates media data.

13. The method of claim 12, wherein forwarding the message includes forwarding the message based on a message handler supplied by a particular plug-in component of said certain plurality of plug-in components.

14. A non-transitory computer-readable volatile or non-volatile memory storing one or more sequences of instructions which, when executed by one or more processors, causes the one or more processors to perform the method recited in claim 13.

15. The method of claim 12, wherein forwarding the message includes forwarding the message to a particular plug-in component based on information in the message that specifically identifies the particular plug-in component or that describes a category of plug-in components.

16. A non-transitory computer-readable volatile or non-volatile memory storing one or more sequences of instructions which, when executed by one or more processors, causes the one or more processors to perform the method recited in claim 15.

17. The method of claim 12, wherein forwarding the message includes forwarding the message to a particular plug-in component of said certain plurality of plug-in components, wherein the forwarding occurs asynchronously to the call to the message interface.

18. The method of claim 17, further comprising scheduling handling of the message based on a time specified in the message.

19. A non-transitory computer-readable volatile or non-volatile memory storing one or more sequences of instructions which, when executed by one or more processors, causes the one or more processors to perform the method recited in claim 18.

20. The method of claim 17, further comprising scheduling handling of the message by adding the message to a message queue of the certain graph component.

21. A non-transitory computer-readable volatile or non-volatile memory storing one or more sequences of instructions which, when executed by one or more processors, causes the one or more processors to perform the method recited in claim 20.

22. A non-transitory computer-readable volatile or non-volatile memory storing one or more sequences of instructions which, when executed by one or more processors, causes the one or more processors to perform the method recited in claim 17.

23. A non-transitory computer-readable volatile or non-volatile memory storing one or more sequences of instructions which, when executed by one or more processors, causes the one or more processors to perform the method recited in claim 12.

24. A non-transitory computer-readable volatile or non-volatile memory storing one or more sequences of instructions which, when executed by one or more processors, causes the one or more processors to perform the method recited in claim 1.

25. The method of claim 1, further including the steps of:
the graph receiving a message;
determining whether there is a recipient for the message within the graph;
in response to determining that there is not a recipient for the message within the graph:
adding another component within the graph, and
routing the message to the another component; and
wherein the another component is either:
a graph component of said plurality of graph components, and
a plug-in component of the plurality of plug-in components of a certain graph component of said plurality of graph components, said certain graph component being within the graph when the message is received.

26. A non-transitory computer-readable volatile or non-volatile memory storing one or more sequences of instructions which, when executed by one or more processors, causes the one or more processors to perform the method recited in claim 25.

27. The method of claim 1, wherein, for each respective graph component of the plurality of graph components, the step of recursively invoking plug-in components in each working strip of plug-in components in each of said plurality of graph components is performed without invoking the respective graph component.

28. A non-transitory computer-readable volatile or non-volatile memory storing one or more sequences of instructions which, when executed by one or more processors, causes the one or more processors to perform the method recited in claim 27.

29. The method of claim 1, wherein the step of recursively invoking plug-in components comprises the input plug-in component of the working strip of the parent graph component invoking the output plug-in component of a working strip of at least two intermediate or leaf components.

30. A non-transitory computer-readable volatile or non-volatile memory storing one or more sequences of instructions which, when executed by one or more processors, causes the one or more processors to perform the method recited in claim 29.

31. The method of claim 1, further comprising:
receiving, at a particular graph component, instructions for modifying a parameter that affects the manipulation or processing of media data in the graph;
based on the hierarchical structure, identifying one or more other graph components to which to forward the instructions;
forwarding the instructions to the identified one or more other graph components.

32. A non-transitory computer-readable volatile or non-volatile memory storing one or more sequences of instructions which, when executed by one or more processors, causes the one or more processors to perform the method recited in claim 31.

33. The method of claim 1, further comprising adding a subgraph to the graph while the graph is in a running state.

34. A non-transitory computer-readable volatile or non-volatile memory storing one or more sequences of instructions which, when executed by one or more processors, causes the one or more processors to perform the method recited in claim 33.

35. A method comprising:
generating a graph that includes a plurality of graph components that input and output media data, wherein the graph conforms to a multi-level, branched hierarchical structure;
wherein the graph comprises at least:
1) a parent component, at the top level of the hierarchical structure, that outputs media data;
2) a plurality of intermediate components, including a first plurality of intermediate components that output media data to the parent component;
3) a plurality of leaf components that input media data from media sources, wherein each leaf component of the plurality of leaf components outputs media data to a component at a higher-level in the hierarchical structure;
wherein each graph component of said plurality of graph components comprises an ordered, working strip of plug-in components, each said working strip comprising an input plug-in component and an output plug-in component; and
recursively invoking plug-in components in each working strip of plug-in components in each of said plurality of graph components, beginning with the parent component and proceeding down the hierarchical structure, thereby causing media streams to flow from the plurality of media sources, through working strips of plug-in components in said plurality of leaf components and said plurality of intermediate components, and to the parent component; outputting media data at the parent component based on the media streams;
adding a subgraph to the graph, the subgraph including at least a root component that outputs media data, wherein adding the subgraph includes:
generating a copy of a first plug-in component in the graph, wherein the first plug in component and the copy of the first plug-in component each comprise a collection of pointers to other graph components, or plug-in components of other graph components, in the graph;
adding a pointer to the root component, or a plug-in component of the root component, to the copy of the collection;
propagating properties from the graph to the subgraph; and
replacing the first plug-in component with the copy of the plug-in component;
wherein the steps of the method are performed by one or more computing devices.

36. A non-transitory computer-readable volatile or non-volatile memory storing one or more sequences of instructions which, when executed by one or more processors, causes the one or more processors to perform the method recited in claim 35.

37. The method of claim 35,
wherein the steps of recursively invoking plug-in components and outputting media data are performed periodically by a working thread; and
wherein the step of adding the subgraph is scheduled to be performed while the working thread is active, at a time either before or after the working thread performs the steps of recursively invoking plug-in components and outputting media data.

38. A non-transitory computer-readable volatile or non-volatile memory storing one or more sequences of instructions which, when executed by one or more processors, causes the one or more processors to perform the method recited in claim 37.

39. The method of claim 35, wherein adding the subgraph occurs while the graph is in a running state.

40. A non-transitory computer-readable volatile or non-volatile memory storing one or more sequences of instructions which, when executed by one or more processors, causes the one or more processors to perform the method recited in claim 39.

* * * * *

UNITED STATES PATENT AND TRADEMARK OFFICE
CERTIFICATE OF CORRECTION

| | | |
|---|---|---|
| PATENT NO. | : 7,870,562 B1 | Page 1 of 1 |
| APPLICATION NO. | : 11/165811 | |
| DATED | : January 11, 2011 | |
| INVENTOR(S) | : Craig Hansen-Sturm | |

It is certified that error appears in the above-identified patent and that said Letters Patent is hereby corrected as shown below:

In column 1, line 19, after "graph" insert -- . --.

In column 2, line 31, after "graph" insert -- . --.

In column 3, line 19, after "dynamically" insert -- . --.

In column 5, line 47, after "Inc" insert -- . --.

In column 7, line 23, after "supplied" insert -- . --.

In column 8, line 46, after "the strip" insert -- . --.

In column 9, line 42, after "121" insert -- . --.

In column 10, line 22, after "MIX" insert -- . --.

In column 11, line 1, after "active" insert -- . --.

In column 11, line 9, after "subgraph" insert -- . --.

In column 11, line 28, after "parent" insert -- . --.

In column 11, line 58, after "time" insert -- . --.

Signed and Sealed this
First Day of November, 2011

David J. Kappos
*Director of the United States Patent and Trademark Office*